US009890869B2

(12) United States Patent
Lv

(10) Patent No.: US 9,890,869 B2
(45) Date of Patent: Feb. 13, 2018

(54) ELECTRONIC EXPANSION VALVE

(71) Applicant: Zhejiang Sanhua Co., Ltd., Zhejiang (CN)

(72) Inventor: Ming Lv, Zhejiang Province (CN)

(73) Assignee: Zhejiang Sanhua Climate and Appliance Controls Group Co., Ltd, Chengguan Town (CN)

( * ) Notice: Subject to any disclaimer, the term of this patent is extended or adjusted under 35 U.S.C. 154(b) by 118 days.

(21) Appl. No.: 14/650,276

(22) PCT Filed: May 29, 2013

(86) PCT No.: PCT/CN2013/076411
§ 371 (c)(1),
(2) Date: Jun. 5, 2015

(87) PCT Pub. No.: WO2014/089953
PCT Pub. Date: Jun. 19, 2014

(65) Prior Publication Data
US 2015/0316168 A1 Nov. 5, 2015

(30) Foreign Application Priority Data

Dec. 11, 2012 (CN) .......................... 2012 1 0537711
Dec. 11, 2012 (CN) .......................... 2012 1 0538834

(51) Int. Cl.
*F16K 31/02* (2006.01)
*F16K 31/04* (2006.01)
(Continued)

(52) U.S. Cl.
CPC ................ *F16K 31/02* (2013.01); *F16K 1/54* (2013.01); *F16K 27/02* (2013.01); *F16K 31/047* (2013.01); *F16K 31/53* (2013.01)

(58) Field of Classification Search
CPC .......... F16K 31/02; F16K 31/50; F16K 27/00; F16K 31/53; F16K 31/04
(Continued)

(56) References Cited

U.S. PATENT DOCUMENTS 3,001,551 A * 9/1961 Wyser ..................... F16K 1/526
137/614.11
3,918,726 A * 11/1975 Kramer .................. F16J 15/166
277/651
(Continued)

FOREIGN PATENT DOCUMENTS

CN 2483564 Y 3/2002
CN 202109047 U 1/2012
(Continued)

OTHER PUBLICATIONS

International Search Report dated Sep. 26, 2013 from corresponding International Application No. PCT/CN2013/076411.
(Continued)

*Primary Examiner* — Kevin Murphy
*Assistant Examiner* — Patrick Williams
(74) *Attorney, Agent, or Firm* — Wolf, Greenfield & Sacks, P.C.

(57) ABSTRACT

An electronic expansion valve is provided, a valve rod of which is provided with an axial through-hole in communication with a valve port, and a lateral wall of the axial through-hole of the valve seat is sealed with respect to the valve rod. An end surface of the valve rod includes a sealing surface in sealing contact with an end surface at the valve port, the sealing surface includes a first sealing surface to bear an action force of refrigerant at one connecting port and a second sealing surface to bear an action force of refrigerant at another connecting port, and the effective pressure-bearing area of the first sealing surface is equal to that of the
(Continued)

second sealing surface. Further provided is an electronic expansion valve in line contact seal with the valve seat.

15 Claims, 11 Drawing Sheets

(51) Int. Cl.
*F16K 1/54* (2006.01)
*F16K 27/02* (2006.01)
*F16K 31/53* (2006.01)

(58) Field of Classification Search
USPC ....... 251/333, 229, 269, 332, 334, 327, 282, 251/129.11; 137/552, 554
See application file for complete search history.

(56) References Cited

U.S. PATENT DOCUMENTS

| | | | |
|---|---|---|---|
| 4,285,498 A * | 8/1981 | Nightingale | F16K 27/00 251/214 |
| 4,556,193 A | 12/1985 | Yoshiga | |
| 6,460,567 B1 * | 10/2002 | Hansen, III | F16K 31/04 137/554 |
| 6,568,565 B1 | 5/2003 | Wrocklage | |
| 6,568,656 B1 | 5/2003 | Wrocklage | |

FOREIGN PATENT DOCUMENTS

| | | |
|---|---|---|
| CN | 102644785 A | 8/2012 |
| CN | 103512287 A | 1/2014 |
| JP | 6457471 U | 4/1989 |
| JP | H0979409 A | 3/1997 |
| JP | 10311434 A | 11/1998 |
| JP | H10311434 A | 11/1998 |
| JP | 2000227165 A | 8/2000 |
| JP | 2001241562 A | 9/2001 |
| JP | 2001280535 A | 10/2001 |
| JP | 2001280728 A | 10/2001 |

OTHER PUBLICATIONS

International Search Report, dated Aug. 20, 2013, from a corresponding International Application No. PCT/CN2013/076411.
Written Opinion, dated Sep. 26, 2013, from a corresponding International Application No. PCT/CN2013/076411.
Chinese Office Action, dated Dec. 3, 2015, from a related Chinese Application No. 2012105377113.
Chinese Office Action, dated Dec. 25, 2015, from corresponding Chinese Application No. 201210538834.9.
Extended European Search Report, dated Aug. 5, 2016, from related European Application No. 13862253.5.

* cited by examiner

ELECTRONIC EXPANSION VALVE

This application is the national phase of International Application No. PCT/CN2013/076411, filed on May 29, 2013, which claims the priority benefit of Chinese Patent Application Number 201210537711.3 titled "ELECTRONIC EXPANSION VALVE", filed with the Chinese State Intellectual Property Office on Dec. 11, 2012, and Chinese Patent Application No. 201210538834.9 titled "ELECTRONIC EXPANSION VALVE", filed with the Chinese State Intellectual Property Office on Dec. 11, 2012, which applications are hereby incorporated by reference to the maximum extent allowable by law.

TECHNICAL FIELD

The present application relates to the technical field of engineering machinery, and particularly to an electronic expansion valve.

BACKGROUND

Reference is made to FIGS. 1 to 2, FIG. 1 is a schematic view showing the structure of a typical electronic expansion valve, and FIG. 2 is a schematic view showing the structure of cooperation between a valve seat and a valve rod in FIG. 1.

The electronic expansion valve includes a valve house 100 and a valve seat component 10, a valve cavity is formed by arranging the valve house 100 and the valve seat component 10, and a valve rod 204 is provided inside the valve cavity. An electric machine 104 and a gear system 106 are provided inside the valve house 100, the electric machine 104 drives the gear system 106 to rotate, and the gear system 106 cooperates with the valve rod 204 to drive the valve rod 204 to move upward and downward along an axial direction.

A valve port 202, a first connecting port 34 and a second connecting port 36 are provided in the valve seat component 10, and the valve port 202 opens or closes to allow or prevent the communication between the first connecting port 34 and the second connecting port 36. Referring to FIG. 1, a valve rod cone-shaped end 42 is arranged at a lower end of the valve rod 204, and the communication between the first connecting port 34 and the second connecting port 36 is disconnected when the valve rod 204 moves downward to block the valve port 202. The communication between the first connecting port 34 and the second connecting port 36 is allowed when the valve rod moves upward to leave the valve port 202.

The valve rod 204 is generally machined to form a structure having a small upper end and a large lower end, for ensuring that the valve rod 204 of such structure can be assembled, the valve seat component 10 is a separated structure, which includes a valve seat base 102 and a valve seat sleeve 16. An axial through-hole is provided in the valve seat sleeve 16, thus the valve rod 204 can move axially inside the axial through-hole. A lower end of the valve seat sleeve 16 presses against an upper end of the valve seat base 102; to ensure a reliable connection between the valve seat sleeve 16 and the valve seat base 102, a positioning sleeve 20 is further provided, and the positioning sleeve 20 is sleeved on a portion where the valve seat sleeve 16 presses against the valve seat base 102.

For improving the performance of the electronic expansion valve, a lateral hole 205 is provided in the valve rod 204, as shown in FIG. 2. When the lateral hole 205 is arranged above, namely the lateral hole 205 is arranged at an upper side of the valve rod cone-shaped end 42, in this case if a high-pressure refrigerant enters via the second connecting port 36, the valve port 202 is easy to open while not easy to close; if the high-pressure refrigerant enters via the first connecting port 34, the valve port 202 is easy to close but not easy to open. When the lateral hole 205 is arranged below, the open and closed conditions of the valve port are opposite to the above case. Therefore, for the valve of the electronic expansion valve with such a structure, the resistances to open valve when the refrigerant enters via the first connecting port and the second connecting port respectively are unequal and are difficult to balance.

Moreover, in order to assemble the valve rod 204, the valve seat component 10 needs to be designed as a separated structure, the separated structure is complicated, the assembled valve seat component is apt to loose due to transportation vibration or the effect of vibration of device, which may result in an outleakage of the refrigerant inside the valve, thereby causing refrigeration failures and environmental pollutions. Therefore, a bowl-shaped plastic sheet 104 is provided for sealing, as shown in FIG. 1, the bowl-shaped plastic sheet 104 is arranged around the valve rod 204, and has an opening facing a direction of the valve housing 100.

However, the bowl-shaped plastic sheet 104 can only realize a one-way seal when the high-pressure refrigerant enters via the opening (namely the high-pressure refrigerant enters via the first connecting port 34), if the high-pressure refrigerant enters via a port opposite to the opening (that is the high-pressure refrigerant enters via the second connecting port 36), the bowl-shaped plastic sheet 104 is shrunken under the action of force, thus still causing refrigerant leakage.

In view of this, a technical issue to be addressed urgently by those skilled in the field is to improve the structure of the electronic expansion valve to balance the capacities to open and close the valve.

SUMMARY

For addressing the above technical issue, an electronic expansion valve is provided by the present application, which may balance the capacities to open and close the valve.

An electronic expansion valve according to the present application includes a valve cavity, and a valve rod is arranged inside the valve cavity. The valve rod can axially move along an axial through-hole of a valve seat of the electronic expansion valve to open or close a valve port arranged in the valve seat, in order to allow or prevent the communication between two connecting ports of the electronic expansion valve. The valve rod is provided with an axial through-hole in communication with the valve port, and a lateral wall of the axial through-hole of the valve seat is sealed with the valve rod. An end surface of the valve rod includes a sealing surface which can be in a contact seal with an end surface at the valve port, the sealing surface includes a first sealing surface configured to bear an forward acting force of a refrigerant at one connecting port and a second sealing surface configured to bear an reverse acting force of a refrigerant at another connecting port, and the first sealing surface has an effective pressure-bearing area equal to an effective pressure-bearing area of the second sealing surface.

In the electronic expansion valve, the first sealing surface of the sealing surface of the valve rod is only configured to bear the acting force of refrigerant at one connecting port, and the second sealing surface is only configured to bear the acting force of refrigerant at another connecting port. And the first sealing surface has the effective pressure-bearing area equal to the effective pressure-bearing area of the second sealing surface, and the acting forces of the refrigerants are balanced by reactive forces of the sealing surface at the valve port. An acting force applied on the valve rod 24 is only the sum of the acting forces respectively applied on the first sealing surface and on the second sealing surface. Supposing that a pressure of the refrigerant at an inlet is P1, a pressure of the refrigerant at an outlet is P2, an effective pressure-bearing area of the first sealing surface of the valve rod configured to bear the acting force of the refrigerant at one connecting port is S1, and an effective pressure-bearing area of the second sealing surface of the valve rod configured to bear the acting force of the refrigerant at another connecting port is S2. In a case that one connecting port acts as the inlet for refrigerant, and another connecting port acts as the outlet for refrigerant, the acting force F1 applied on the valve rod satisfies the relationship: F1=P1S1+P2S2. In a case that another connecting port acts as the inlet for refrigerant and one connecting port acts as the outlet for refrigerant, the acting force F2 applied on the valve rod satisfies the relationship: F2=P1S2+P2S1. Since 51 is equal to S2, F1 is equal to F2, therefore the acting forces applied on the valve rod are equal when the refrigerant with a same pressure enters via any connecting port, and the acting force applied on the valve rod is always downward. In conclusion, for the electronic expansion valve of such structure, resistances to open the valve applied on the valve rod are equal no matter the refrigerant flows via which connecting port, and accordingly, resistances to close the valve are also equal, thereby balancing the capacities to open and close the valve. Moreover, when the valve rod is closed, the valve rod is applied with a downward resistance from refrigerant no matter the refrigerant flows in which direction, thus improving the sealing performance of the valve port, and facilitating disconnecting the communication between the first connecting port and the second connecting port, thereby avoiding the refrigerant leakage.

Preferably, the valve rod is a cylinder and includes a small-diameter section cylinder and a large-diameter section cylinder close to the valve port; an end surface of the large-diameter section cylinder includes the first sealing surface and the second sealing surface.

Preferably, an outer ring diameter of the end surface of the large-diameter section cylinder is greater than or equal to an outer ring diameter of a sealing surface at the valve port; an inner ring diameter of the end surface of the large-diameter section cylinder is less than an inner ring diameter of the sealing surface at the valve port. And the outer ring diameter of the sealing surface at the valve port, the inner ring diameter of the sealing surface at the valve port, and an outer ring diameter of the small-diameter section cylinder satisfies the following relationship:

$$D_1 \approx \frac{\sqrt{2}}{2}\sqrt{D_3^2 + D_4^2}$$

where D1 is the outer diameter of the small-diameter section cylinder, D3 is the outer ring diameter of the sealing surface at the valve port, and D4 is the inner ring diameter of the sealing surface at the valve port.

Preferably, the outer ring diameter and the inner ring diameter of the sealing surface at the valve port satisfies the following relationship:

0.4 mm≤D3−D4≤4 mm.

Preferably, an end portion of the large-diameter section cylinder, and one end, where the valve port is arranged, of the valve seat are both provided with a chamfering.

Preferably, the valve seat includes a valve core seat and a valve seat base, the two connecting ports and the valve port are all opened in the valve seat base, the valve core seat is inserted into the valve seat base, and the axial through-hole is opened in the valve core seat.

Preferably, the valve core seat is opened with a lateral hole in communication with one of the two connecting ports, a width of the lateral hole is increased in a direction away from the valve port, and the another connecting port of the two connecting ports is in communication with the valve port; the connecting port in communication with the lateral hole communicates with the valve port via the lateral hole in a case that the valve rod moves axially to disengage from the valve port.

Preferably, one of, an inner lateral wall of the axial through-hole of the valve, and an outer lateral wall of the valve rod, is provided with a mounting groove, and a sealing ring is provided inside the mounting groove.

Preferably, the valve seat includes a valve core seat and a valve base, the valve core seat is inserted into the valve base, the axial through-hole is provided in the valve core seat. The axial through-hole of the valve core seat is a stepped hole, and the stepped hole forms a ring-shaped step surface facing a valve house of the electronic expansion valve. The valve seat further includes a position-limiting sleeve, the position-limiting sleeve is inserted into the stepped hole, an end portion of the position-limiting sleeve has a ring-shaped radial lug boss, and the radial lug boss overlaps an end surface, facing the valve house, of the valve core seat. An inner lateral wall of the valve core seat, an end surface facing the valve port of the position-limiting sleeve, and the ring-shaped step surface form the mounting groove, and the sealing ring is provided inside the mounting groove.

Preferably, a check ring is provided between the sealing ring and the ring-shaped step surface, an assembling clearance exists between a lateral wall, of a small-diameter section, of the stepped hole of the valve core seat, and the valve rod; the check ring is in a clearance fit with the valve rod.

Preferably, the electronic expansion valve further includes a gear system driving the valve rod to move axially, the gear system includes position-limiting rods limiting a circumferential rotation of the valve rod; the position-limiting rods press the position-limiting sleeve tightly onto the valve core seat.

Preferably, the electronic expansion valve further includes a ring-shaped slide-assisting sheet arranged inside the mounting groove, the slide-assisting sheet is in contact with the outer lateral wall of the valve rod, and the sealing ring is arranged between the slide-assisting sheet and the inner lateral wall of the valve core seat.

Preferably, a cross section of the slide-assisting sheet is C-shaped, and a C-shaped opening of the slide-assisting sheet faces to the sealing ring.

Preferably, a thickness of the slide-assisting sheet ranges from 0.2 mm to 0.6 mm.

Preferably, one of materials of the slide-assisting sheet is polytetrafluoroethylene.

An electronic expansion valve is further provided in the present application, a valve cavity of which is provided with a valve rod, and the valve rod may move axially along an axial through-hole of a valve seat of the electronic expansion valve to open or close a valve port arranged in a valve seat, so as to allow or prevent the communication between two connecting ports of the electronic expansion valve. The valve rod is provided with an axial through-hole in communication with the valve port and is in a line contact with the valve seat when the valve rod closes the valve port. When a refrigerant at one connecting port acts on an upper surface and a lower surface of the valve rod respectively, an upper effective pressure-bearing area of the valve rod is equal to a lower effective pressure-bearing area. When a refrigerant at another connecting port acts on an upper surface and a lower surface of the valve rod respectively, an upper effective pressure-bearing area of the valve rod is equal to a lower effective pressure-bearing area.

The valve rod is in line contact with a valve seat when the valve rod moves to close the valve port, the refrigerant at one connecting port applies acting forces to an upper surface and a lower surface of the valve rod respectively, and an upper and a lower effective pressure-bearing areas of the valve rod are equal; the refrigerant at another connecting port applies acting forces to the upper surface and the lower surface of the valve rod respectively, and an upper and a lower effective pressure-bearing areas of the valve rod are equal. That is to say, acting forces applied by the refrigerants at the first connecting port and the second connecting port on the valve rod can be counteracted, thus the resultant force applied on the valve rod is zero regardless of different flow directions of the refrigerant, thereby balancing the resistances to open valve in a case that the refrigerant flows in different flow directions.

Preferably, the valve rod is a cylinder, and includes a small-diameter section cylinder and a large-diameter section cylinder close to the valve port. The large-diameter section cylinder has a cone-shaped end, and the cone-shaped end may be in line contact with the valve seat. A sealing ring line formed when the cone-shaped end is in line contact with the valve seat has a diameter equal to a diameter of the small-diameter section cylinder.

Figure 1:
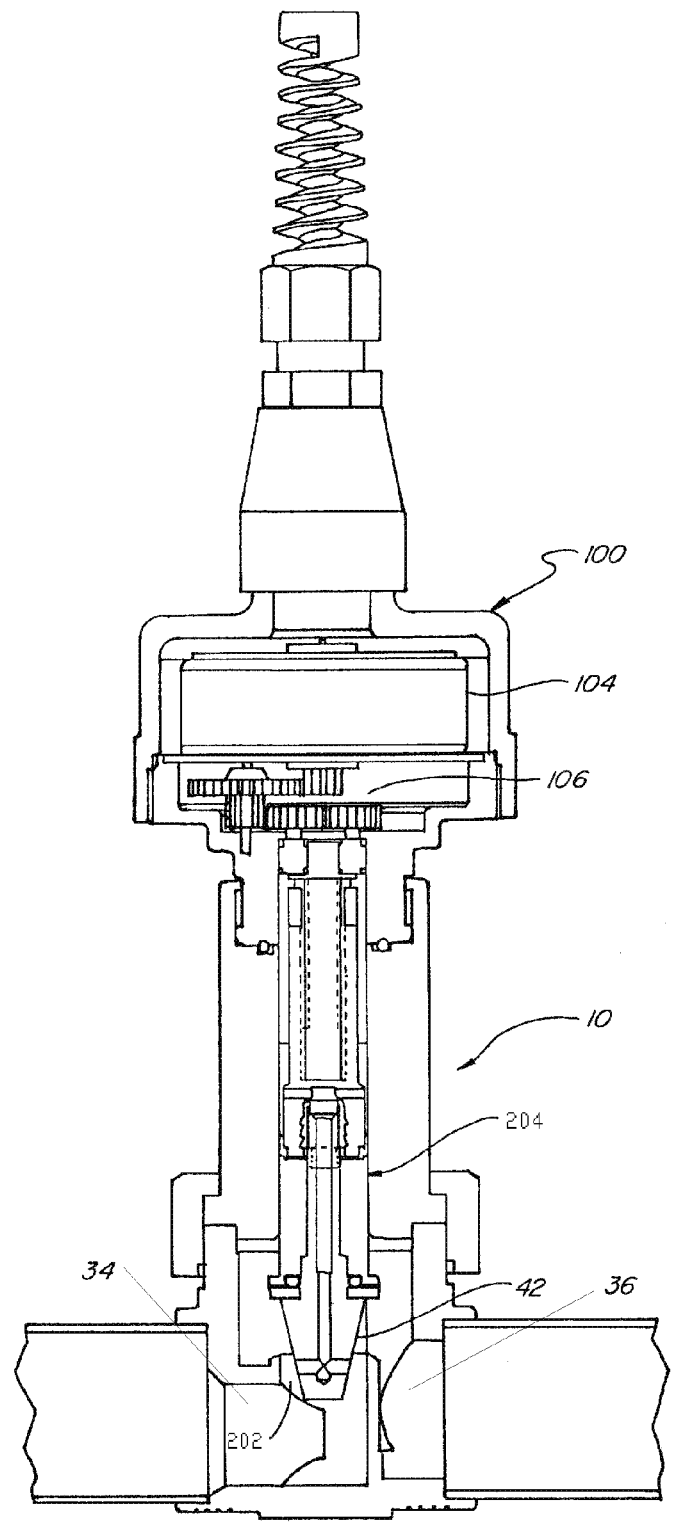
FIG. 1 is a schematic view showing the structure of a typical electronic expansion valve.
Figure 2:
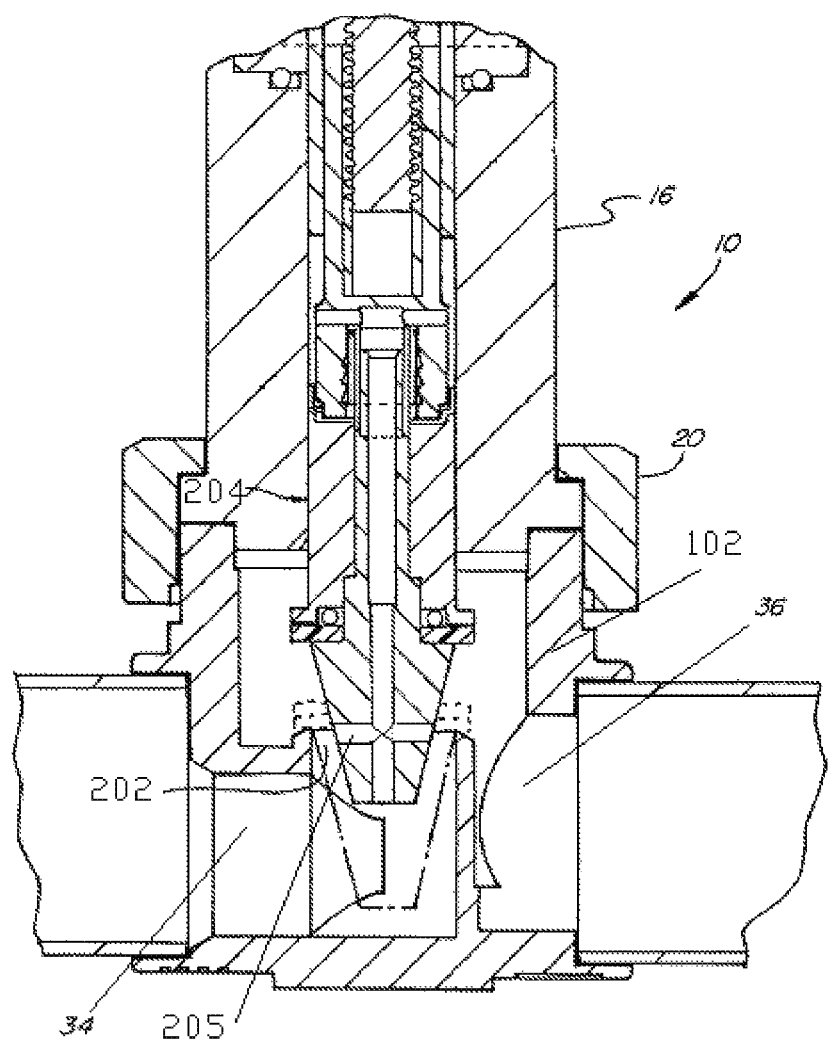
FIG. 2 is a schematic view showing the structure of cooperation between a valve seat and a valve rod in FIG. 1.

Corresponding relationships between reference numerals and components in FIGS. 1 and 2 are as follows:

| 100 | valve house, | 104 | electric machine, |
| 106 | gear system, | 10 | valve seat component, |
| 204 | valve rod, | 42 | cone-shaped end of valve rod, |
| 205 | lateral hole, | 34 | first connecting port; |
| 36 | second connecting port, | 202 | valve port, |
| 16 | valve seat sleeve, | 20 | positioning sleeve, |
| 102 | valve seat base | 104 | bowl-shaped plastic sheet. |

Corresponding relationships between reference numerals and components in FIGS. 3 to 15 are as follows:

| 21 | valve house, | 22 | electric machine, |
| 23 | gear system, | 231 | gear, |
| 232 | position-limiting rod, | 233 | screw rod, |
| 24 | valve rod, | 24b | large-diameter section cylinder, |
| 24a | small-diameter section cylinder, | 241 | buckle, |
| 241a | lug boss, | 25 | valve seat base, |
| 251 | valve port, | 26 | valve core seat, |
| 261 | ring-shaped step surface, | 262 | lateral hole, |
| 271 | sealing ring, | 272 | slide-assisting sheet, |
| 28 | check ring, | 29 | position-limiting sleeve, |
| 31 | first connecting pipe; and | 32 | second connecting pipe. |

DETAILED DESCRIPTION

For those skilled in the field to better understand technical solutions of the present application, the present application is described in detail in conjunction with drawings and embodiments hereinafter.

Figure 3:
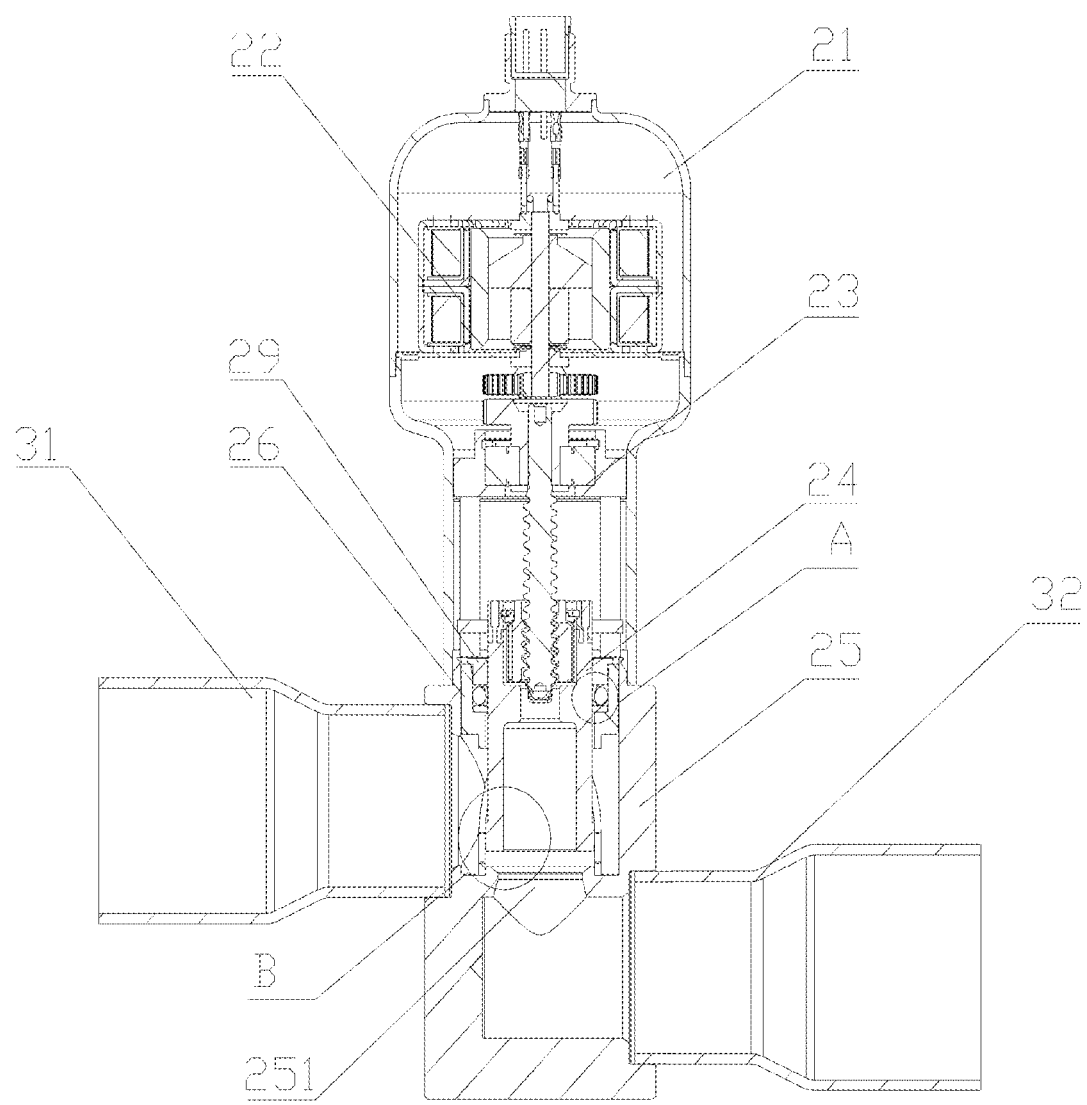
FIG. 3 is a schematic view showing the structure of an electronic expansion valve according to a first embodiment of the present application.
Figure 4:
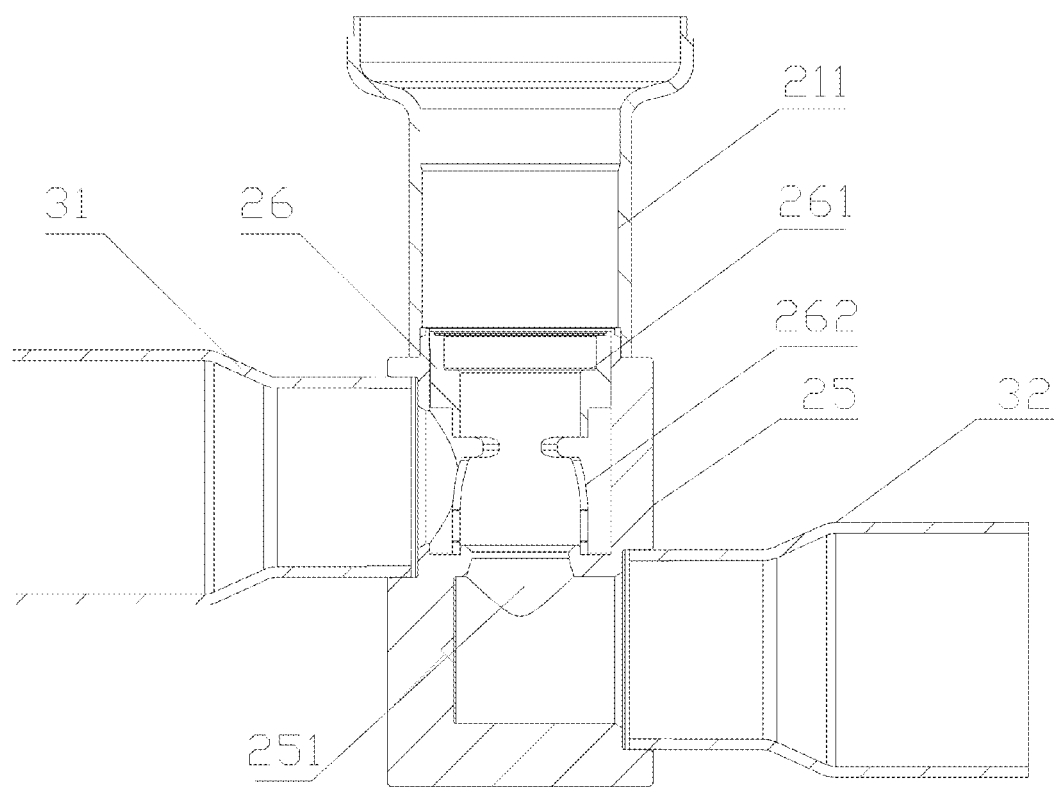
FIG. 4 is a schematic view showing the structure of the electronic expansion valve when a valve rod in not assembled to the electronic expansion valve in FIG. 3.

Reference is made to FIGS. 3 and 4, FIG. 3 is a schematic view showing the structure of an electronic expansion valve according to a first embodiment of the present application, and FIG. 4 is a schematic view showing the structure when a valve rod is not provided in FIG. 3.

The electronic expansion is provided in the present application, a valve rod 24 is provided inside a valve cavity of the electronic expansion valve, and the valve rod 24 can move axially along an axial through-hole of a valve seat of the electronic expansion valve to open or close a valve port 251 arranged in the valve seat in order to allow or prevent the communication between two connecting ports of the electronic expansion valve. A first connecting pipe 31 connected to a first connecting port and a second connecting pipe 32 connected to a second connecting port are shown in FIGS. 3 and 4.

Besides, in this embodiment, the valve rod 24 is provided with an axial through-hole in communication with the valve port 251, as shown in FIG. 3, the valve port 251 is in communication with the second connecting port throughout, the second connecting port is in communication with the axial through-hole of the valve rod 24, and a refrigerant in the second connecting pipe 32 may enter into an upper cavity (part of the valve cavity) of the valve rod 24 via the axial through-hole of the valve rod 24. For ensuring the sealing, obviously, a lateral wall of the axial through-hole of the valve seat needs to be sealed with respect to the valve rod 24, the seal herein should not be regarded as the seal between the entire lateral wall of the axial through-hole of the valve seat and the valve rod 24, actually the lateral wall can also be partially contiguously sealed, as long as the communication between the upper cavity and the first connecting port can't be allowed through a clearance between the valve rod 24 and the lateral wall of the axial through-hole of the valve seat, so as to ensure that the communication between the first connecting port and the second connecting port can only be allowed after the valve port 251 is opened.

A contact seal may be provided between an end surface of the valve rod 24 and an end surface at the valve port 251 of the valve seat, and a part of the end surfaces, which are in contact with each other, is a respective sealing surface of the valve rod 24 and the valve seat. The valve port 251 at an opening state is shown in FIG. 3, and the valve port 251 is closed when the valve rod 24 moves downward to allow the sealing surface of the valve rod 24 to seal and fit the sealing surface at the valve port 251.

In this embodiment, the sealing surface of the valve rod 24 includes a first sealing surface and a second sealing surface, the first sealing surface is only configured to bear an acting force of the refrigerant at one connecting port, the second sealing surface is only configured to bear an acting force of the refrigerant at another connecting port, and the acting forces of the refrigerant are balanced by reactive forces of the sealing surface at the valve port 251. And the first sealing surface has an effective pressure-bearing area equal to an effective pressure-bearing area of the second sealing surface, and the effective pressure-bearing area herein refers to a projected area on a surface perpendicular to a pressure of the refrigerant. In the case that an area of the sealing surface of the valve rod 24 is less than an area of the end surface of the valve rod 24, part of a downward acting force of the refrigerant balances and counteracts part of an upward acting force of the refrigerant, namely the acting force applied on the valve rod 24 is the resultant force of the acting forces applied on the first sealing surface and on the second sealing surface.

Supposing that a pressure of the refrigerant at an inlet is P1, a pressure of the refrigerant at an outlet is P2, the effective pressure-bearing area of the first sealing surface of the valve rod 24, configured to bear the acting force of the refrigerant at one connecting port, is S1, and the effective pressure-bearing area of the second sealing surface of the valve rod 24, configured to bear the acting force of the refrigerant at another connecting port, is S2. In a case that first connecting port acts as the inlet for refrigerant, and the second connecting port acts as the outlet for refrigerant, the acting force F1 applied on the valve rod 24 satisfies the relationship: F1=P1S1+P2S2. In a case that the second connecting port acts as the inlet for refrigerant and the first connecting port acts as the outlet for refrigerant, the acting force F2 applied on the valve rod 24 satisfies the relationship: F2=P1S2+P2S1. Since 51 is equal to S2, F1 is equal to F2. Therefore the acting forces applied on the valve rod 24 are equal when the refrigerant with a same pressure enters via which connecting port, and the acting force applied on the valve rod 24 is always downward viewed from an angle of FIG. 3.

In conclusion, for the electronic expansion valve of such structure, the resistances to open the valve, applied on the valve rod 24, are equal no matter the refrigerant flows in which direction, and accordingly, the resistances to close the valve, of the valve rod, are also equal, thereby balancing the capacities to open the valve and close the valve. Moreover, when the valve rod 24 is closed, the valve rod is applied with the downward resistance no matter the refrigerant flows in which direction, thus improving the sealing performance of the valve port 251 and facilitating disconnecting the communication between the first connecting port and the second connecting port, thereby avoiding the refrigerant leakage. Of course, S1 and S2 may be properly designed to balance the resistance to open the valve and the driving force to close the valve.

It may be appreciated that, the effective pressure-bearing area of the first sealing surface being equal to the effective pressure-bearing area of the second sealing surface here should be a state of being approximately equal, even if there is a slight deviation between the effective pressure-bearing areas, balance between the capacities to open the valve and close the valve can also be realized. And due to machining errors, actually, it is difficult to ensure that the effective pressure-bearing area of the first sealing surface is absolutely equal to that of the second sealing surface.

Figure 5:
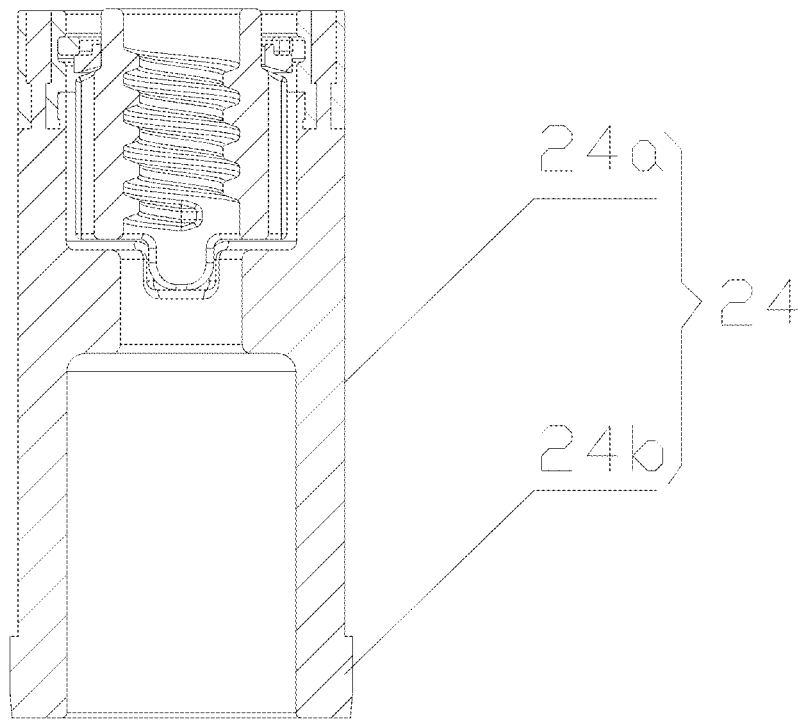
FIG. 5 is a schematic view showing the structure of the valve rod in FIG. 3.

Specifically, the valve rod 24 may be a cylinder and includes a small-diameter section cylinder 24a and a large-diameter section cylinder 24b which close to the valve port 251, and a seal is kept between the small-diameter section cylinder 24a and the valve seat. A contact seal is provided between an end surface of the large-diameter section cylinder 24b and the end surface at the valve port 251, as shown in FIG. 5, which is a schematic view showing the structure of the valve rod in FIG. 3.

Figure 6:
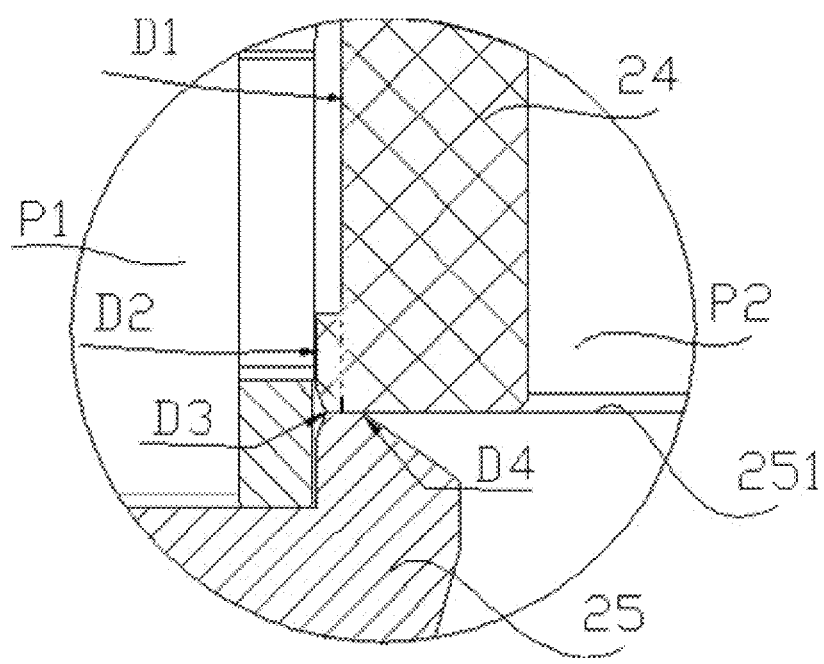
FIG. 6 is a partially enlarged view of portion B in FIG. 3.

Continuing referring to FIG. 6, which is a partially enlarged schematic view showing portion B in FIG. 3, FIG. 6 shows that the valve port 251 is at a closing state. In FIG. 6, the refrigerant enters via the first connecting port and the pressure of the refrigerant is P1, the pressure at the second connecting port is P2, and the pressures at the above two connecting ports are opposite to the pressures in FIG. 6 in the case that the refrigerant enters in an opposite direction.

When the end surface of the large-diameter section cylinder 24b has an outer ring diameter D2 greater than or equal to an outer ring diameter D3 of the sealing surface at the valve port 251, and an inner ring diameter less than an inner ring diameter D4 of the sealing surface at the valve port 251, D1, D3 and D4 satisfy the following relationship:

$$D_1 \approx \frac{\sqrt{2}}{2}\sqrt{D_3^2 + D_4^2};$$

The whole end surface at the valve port 251 is the sealing surface herein. The first sealing surface S1 configured to bear the acting force of the refrigerant at the first connecting port satisfies the relationship: $S1=\pi \times (D_3^2-D_1^2)/4$. The second sealing surface S2 configured to bear the acting force of the refrigerant at the second connecting port satisfies the relationship: $S2=\pi \times (D_1^2-D_4^2)/4$. As described above, when D1 satisfies the relationship:

$$D_1 \approx \frac{\sqrt{2}}{2}\sqrt{D_3^2 + D_4^2},$$

S1 and S2 satisfy the relationship: S1≈S2, the requirement for balance can also be satisfied; and due to machining errors, a slight deviation between S1 and S2 is allowed. As shown in FIG. 6, a dotted line shows the boundary of the end surface where the sealing surface of the valve rod 24 is in contact with the sealing surface at the valve port 251, the first sealing surface at a left side of the dotted line bears the acting force of the refrigerant at the first connecting port (the force applied by the refrigerant to a step surface formed by the large-diameter section cylinder 24b and the small-diameter section cylinder 24a is transmitted to the first sealing surface); the second sealing surface at a right side of the dotted line bears the acting force of the refrigerant at the second connecting port (part of the force, applied by the refrigerant in the upper cavity of the valve rod 24, on the valve rod 24), and the upward and downward acting forces applied by the refrigerant to a non-sealing surface of the end surface of the valve rod 24 counteract each other. With such a design, areas of the sealing surfaces bearing the acting forces of refrigerant at different connecting ports can be simply equalized.

Further, the outer ring diameter and the inner ring diameter of the sealing surface at the valve port 251 may satisfy the following relationship:

$$0.4 \text{ mm} \leq D3-D4 \leq 4 \text{ mm}.$$

In this embodiment, the end surface at the valve port 251 is the sealing surface, namely the end surface of the valve rod 24 may cover the end surface at the valve port 251. The more approximate the values of D3 and D4 are, the smaller the area of a ring sealing surface at the valve port 251 is, the smaller the downward acting force applied by the refrigerant on the valve rod 24 is, the smaller a resistance to the axial movement of the valve rod 24 is. Comprehensively considering a strain intensity of the acting force on the sealing surface and the sealing effect, a difference between the inner diameter D4 and the outer diameter D3 of the sealing surface at the valve port 251 is best to meet the following relationship: $0.4 \text{ mm} \leq D4-D3 \leq 3 \text{ mm}$. With such a design, the resistance acting on the valve rod 24 is small and the refrigerant leakage is avoided.

In FIG. 6, since the end surface of the valve rod 24 is a flat surface perpendicular to the direction of the pressure of the refrigerant, areas of the first sealing surface and the second sealing surface are the effective pressure-bearing areas, therefore the effective pressure-bearing areas of the first sealing surface and the second sealing surface can be equalized when the areas of the first sealing surface and the second sealing surface are equal. Of course, the first sealing surface and the second sealing surface are not limited to the flat surface in FIG. 6, and the end surface of the valve rod 24 may be an oblique plane, as long as an oblique angle of the first sealing surface and an oblique angle of the second sealing surface are the same.

The valve rod in the above embodiments may have a separated structure so as to facilitate machining and improve the design accuracy.

Figure 7:
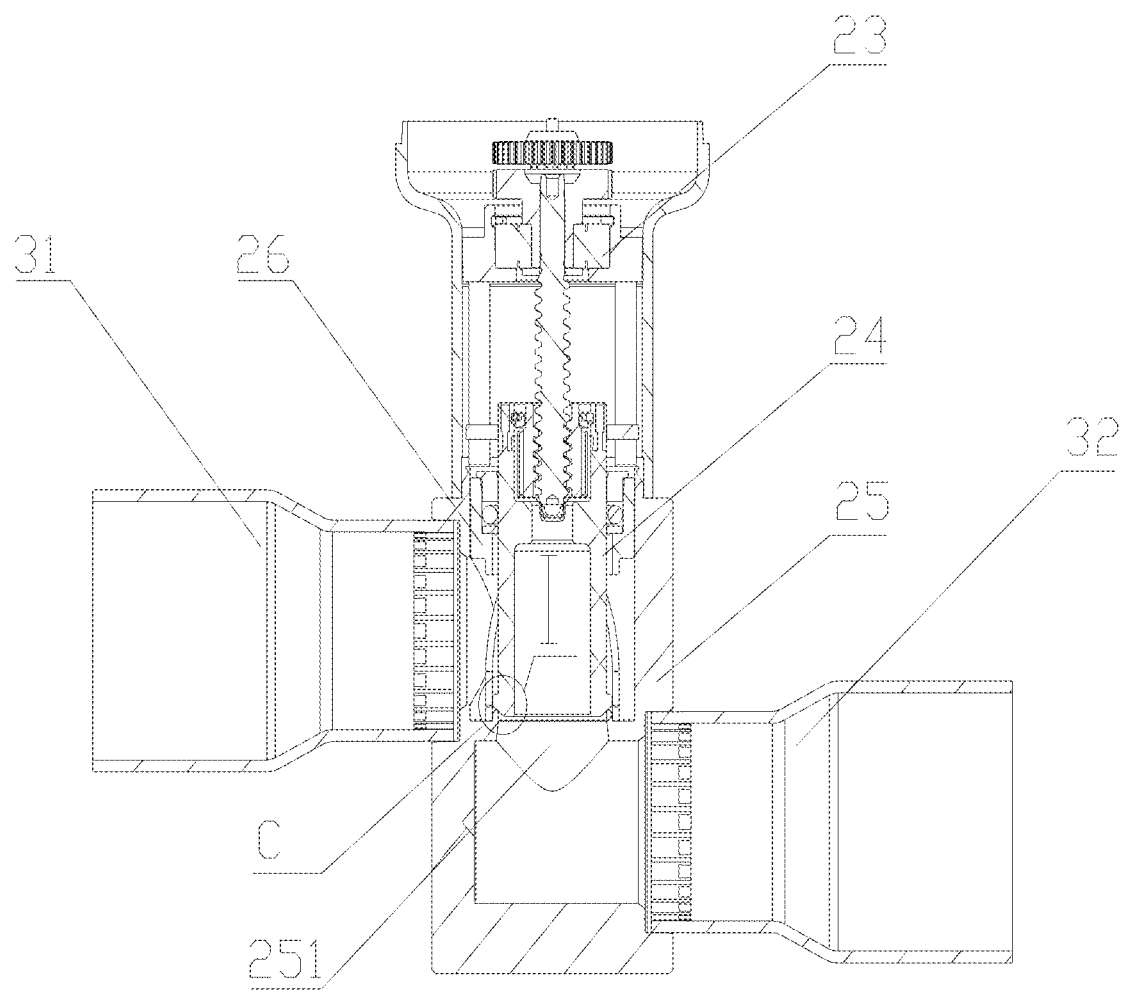
FIG. 7 is a schematic view showing the structure of an electronic expansion valve according to a second embodiment of the present application.
Figure 8:
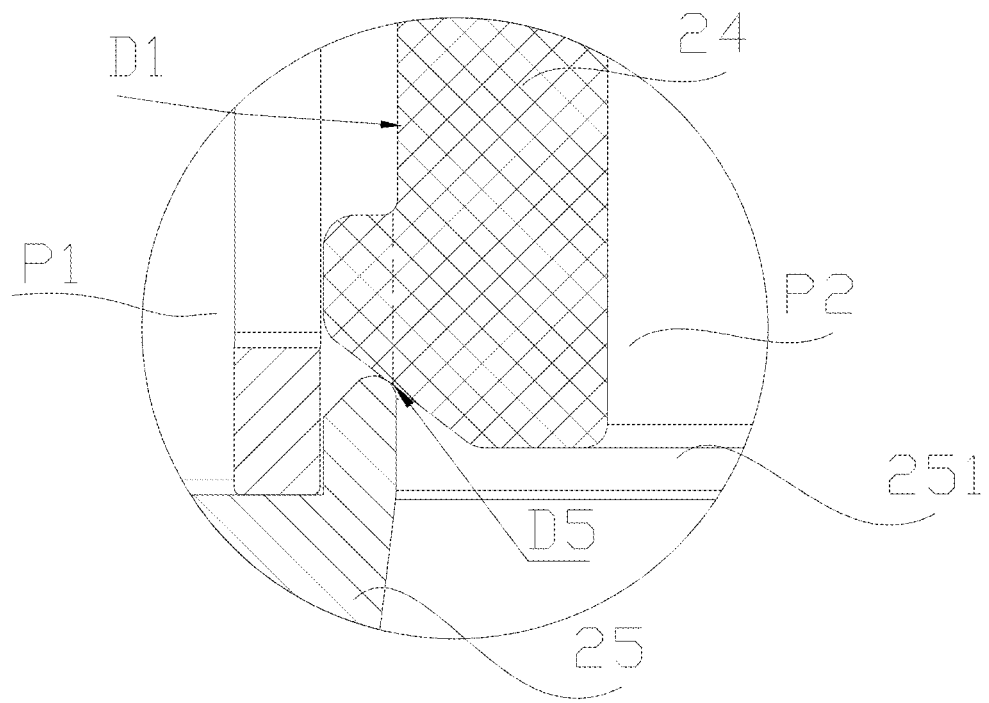
FIG. 8 is a partially enlarged view of portion C in FIG. 7.

Except the above embodiments, in the case that the refrigerant flows in different directions, the valve opening resistance can be balanced via other ways. As shown in FIGS. 7 and 8, FIG. 7 is a schematic view showing the structure of an electronic expansion valve according to a second embodiment of the present application, and FIG. 8 is a partially enlarged schematic view showing portion C in FIG. 7.

In this embodiment, a valve rod 24 is provided inside a valve cavity of the electronic expansion valve, the valve rod 24 is provided with an axial through-hole in communication with a valve port 251, and the valve rod 24 may be applied with an acting force of refrigerant in an upper cavity. The valve rod 24 is in line contact with a valve seat when the valve rod 24 moves to close the valve port 251, the refrigerant at one connecting port applies acting forces to an upper surface and a lower surface of the valve rod 24 respectively, and the effective pressure-bearing areas of the upper surface and the lower surface are equal; the refrigerant at another connecting port applies acting forces to the upper surface and the lower surface of the rod respectively, and effective pressure-bearing areas of the upper surface and the lower surface are equal, similarly the effective pressure-bearing area herein refers to the area of a projection surface perpendicular to the direction of pressure of the refrigerant. That is to say, acting forces applied by refrigerants at the first connecting port and the second connecting port to the valve rod 24 can be counteracted, thus the resultant force applied on the valve rod is zero regardless of different flow directions of the refrigerant, thereby balancing the resistances to open the valve in the case that the refrigerant flows in different directions.

In this embodiment, similar to the cylinder-shaped valve rod 24 in the above embodiment, the valve rod 24 may also be a cylinder, and specifically includes a small-diameter section cylinder 24a and a large-diameter section cylinder 24 b arranged close to the valve port 251. Besides, the large-diameter section cylinder 24b in this embodiment has a cone-shaped end, and the cone-shaped end and the valve seat can be sealed by a line contact. A sealing ring line is formed when the valve seat and the cone-shaped end are in a line contact, and a diameter of the sealing ring line is equal to a diameter of the small-diameter section cylinder 24a, that is D1 is equal to D5, where D1 is an outer ring diameter of the small-diameter section cylinder 24a, and D5 is the diameter of the sealing ring line. It is obvious that, an upper effective pressure-bearing area and a lower effective pressure-bearing area at the left side of a dotted line are equal, and an upper effective pressure-bearing area and a lower effective pressure-bearing area at the right side of a dotted line are also equal.

For the above embodiment, an end portion of the large-diameter section cylinder 24b, and one end of the valve seat where the valve port 251 is arranged are both provided with a chamfering. As shown in FIGS. 6 and 8, with such design, flow of the refrigerant can be well stabilized.

It should be noted that, "the valve seat is in line contact with the cone-shaped end" in this embodiment is an ideal condition, and a small surface contact may exist in a practically used structure, which may result in a slight deviation between the areas of the upper and lower effective pressure-bearing surfaces of the valve rod applied by the refrigerant on the connecting ports. And also, due to machining errors, such slight deviation is actually difficult to avoid. It should be appreciated that, as long as the areas of the upper and down effective pressure-bearing surfaces of the valve rod acted on by the connecting ports are equal, the capacities to open the valve and close the valve can be balanced, and a valve meeting the above requirement should fall into protection scope of the present application.

In the above embodiments, the valve seat specifically may include a valve core seat 26 and a valve seat base 25, the two connecting ports (that is the first connecting port and the second connecting port) and the valve port 251 are all opened in the valve seat base 25, the valve core seat 26 is inserted into the valve seat base 25, and the axial through-hole is arranged in the valve core seat 26, as shown in FIG. 4. The valve seat is arranged in separated structures including the valve seat base 25 and the valve core seat 26, thus facilitates installing the valve rod 24, especially when the valve rod 24 is machined to form a structure having a step with an upper end being small and a lower end being large, the above facilitation effect is obvious.

Figure 9:
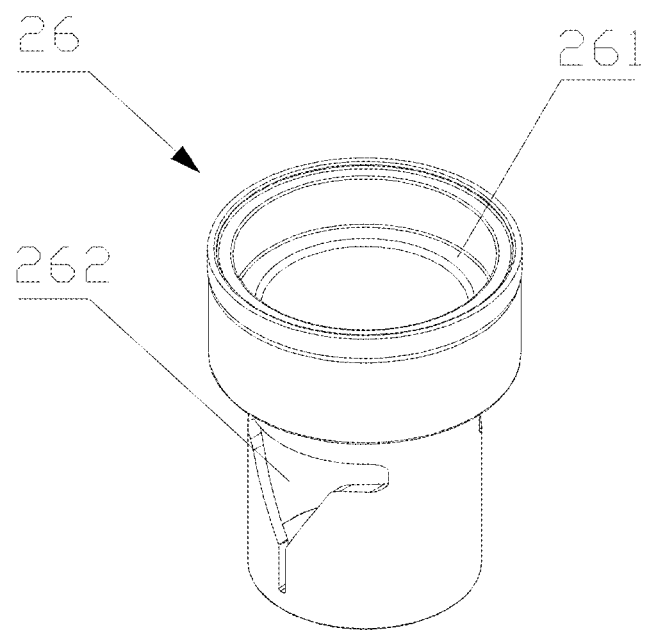
FIG. 9 is a schematic view showing the structure of a valve core seat in FIG. 1.

Specifically, the valve core seat may be opened with a lateral hole 262 in communication with one connecting port of the two connecting ports, as shown in FIG. 9, which is a schematic view showing the structure of a valve core seat in FIG. 3.

As can be seen from the FIGS. 3 and 4, the lateral hole 262 is in communication with the first connecting port, and a width of the lateral hole 262 is increased in a direction away from the valve port 251. When the valve rod 24 moves axially to disengage from the valve port 251, the communication between the first connecting port and the valve port 251 may be allowed through the lateral hole 262. And with the gradually moving up of the valve rod 24, an area of the lateral hole 262 allowing the refrigerant to circulate is gradually increased, thus the flow rate of refrigerant can be adjusted by the axial movements of the valve rod 24.

For the above embodiments, one of, an inner lateral wall of the axial through-hole of the valve seat, and an outer lateral wall of the valve rod 24 can be provided with a mounting groove, and a sealing ring 271 is provided inside the mounting groove. The sealing ring 271 allows the valve seat and the valve rod 24 to have a good sealing performance, and compared with the way of employing a bowel-shaped plastic sheet described in the background technology, the sealing ring 271 in this embodiment can realize a two-way sealing, that is a good sealing effect can be ensured no matter the refrigerant flows in which direction.

In the case that the valve seat includes the valve core seat 26 and the valve seat base 25, the valve port 251 is opened in the valve seat base 25, the valve core seat 26 is inserted into the valve seat base 25, the axial through-hole is arranged in the valve core seat 26, as shown in FIG. 4, the axial through-hole of the valve core seat 26 herein may be arranged in a stepped hole, and the stepped hole forms a ring-shaped step surface 261 facing a valve house 21.

Figure 10:
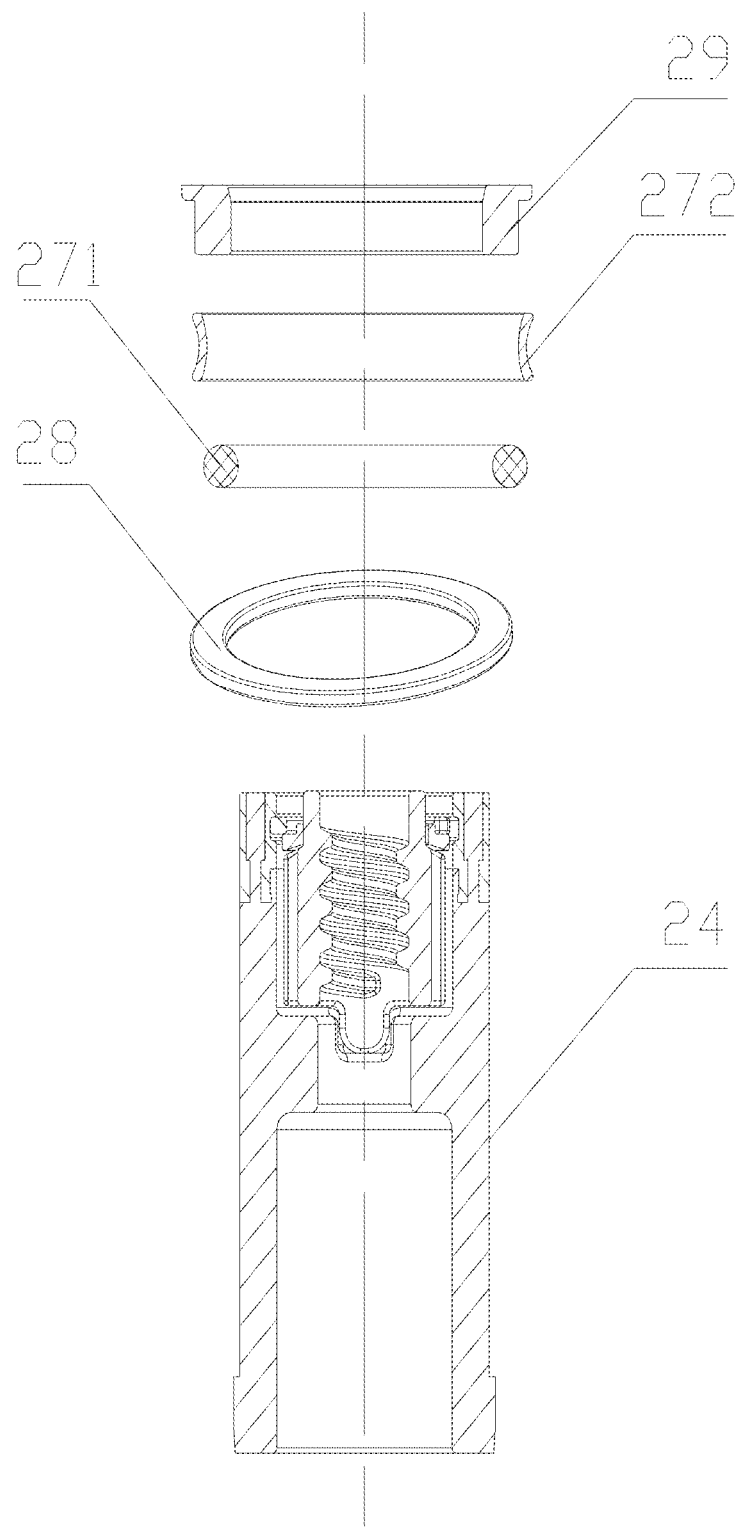
FIG. 10 is a schematic view showing the assembly of the valve rod and a position-limiting sleeve in FIG. 3.
Figure 11:
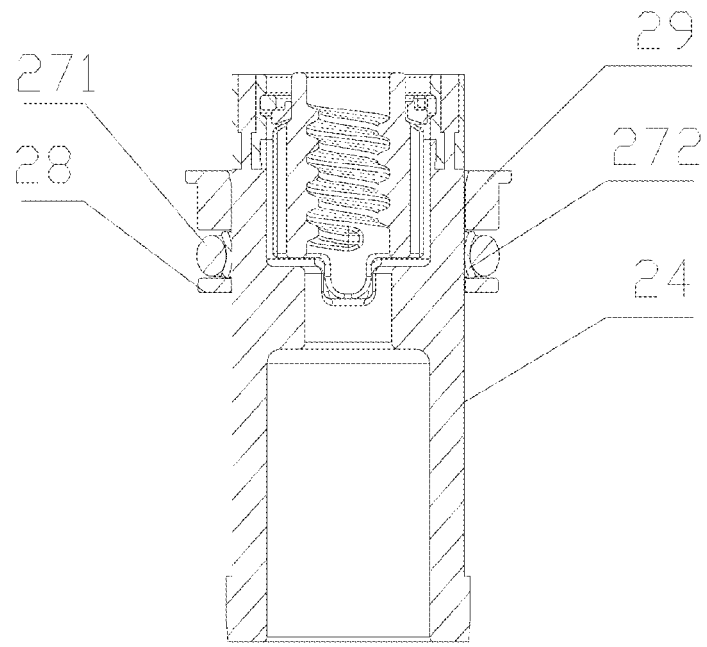
FIG. 11 is a schematic view showing the structure when every part in FIG. 10 is assembled.

The electronic expansion valve may include a position-limiting sleeve 29, which is inserted into the stepped hole, as shown in FIG. 3, and one end portion of the position-limiting sleeve 29 is provided with a ring-shaped radial lug boss, a specific structure of which may refer to FIGS. 10 to 11. FIG. 10 is a schematic view showing the assembly of the valve rod and the position-limiting sleeve in FIG. 3, and FIG. 11 is a schematic view showing FIG. 10 after every component is assembled.

Figure 12:
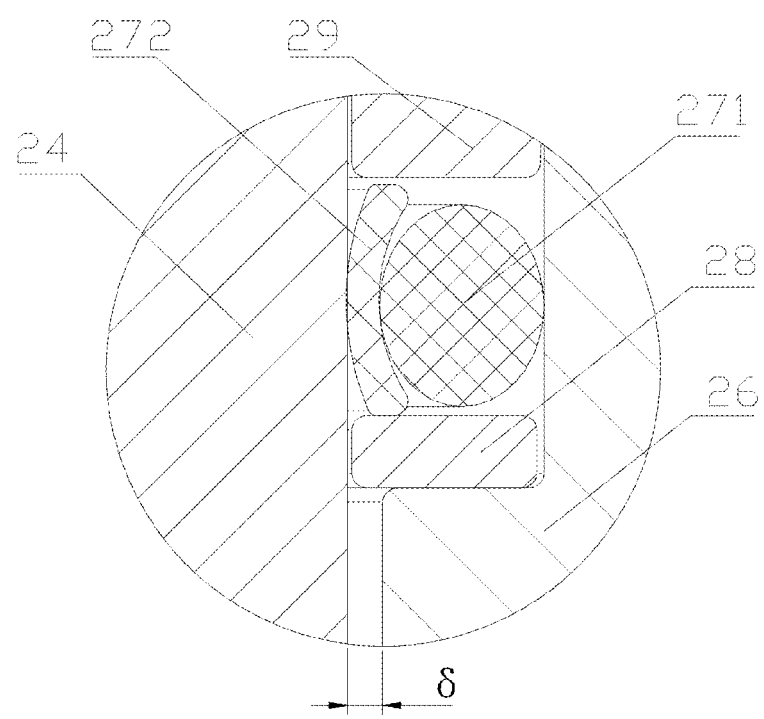
FIG. 12 is a partially enlarged view of portion A in FIG. 3.

The radial lug boss of the position-limiting sleeve 29 overlaps an end surface (an upper end surface in FIG. 3) of the valve core seat facing the valve house 21. An inner lateral wall of the valve core seat 26 (an inner lateral wall of the step hole), an end surface, facing the valve port 251, of the position-limiting sleeve 29, and the ring-shaped step surface 261 form the mounting groove, as shown in FIG. 12, which is a partially enlarged schematic view showing portion A in FIG. 12. The position-limiting sleeve 29 and the valve core seat 26 cooperate to form the mounting groove, and the sealing ring 271 may be arranged inside the mounting groove. Such a structure facilitates assembling the sealing ring 271, the valve rod 24 may be arranged inside the valve core seat 26 first, and then the sealing ring 271 and the position-limiting sleeve 29 are assembled in order. Or as shown in FIG. 11, the sealing ring 271, the position-limiting sleeve 29 and the valve rod 24 are assembled as a whole, and then the whole assembly is arranged inside the valve core seat 26. Of course, the mounting groove may be arranged in the valve rod 24, in view of the strength of the valve rod 24 and the design requirements, the mounting groove is preferably arranged in the valve seat.

Further, a check ring 28 may be provided between the sealing ring 271 and the ring-shaped step surface 261, a certain assembling clearance δ exists between an inner lateral wall of a small-diameter hole of the valve core seat 26 and the valve rod 24. When the valve rod 24 is machined to form the structure with a small upper end and a large lower end, the assembling clearance δ may allow the lower end with a large diameter of the valve rod 24 to pass, thereby meeting the assembling requirements of the valve rod 24, for example, when the valve rod 24 includes the large-diameter section cylinder 24b and the small-diameter section cylinder 24a, the assembling clearance δ is greater than a diameter difference between the two section cylinder, thus facilitating assembly. The check ring 28 may be in a small clearance fit with the valve rod 24, and the check ring 28 herein can prevent the sealing ring 271 due to the assembling clearance δ from disengaging from the mounting groove in the reciprocating motion of the valve rod 24.

In the case that the position-limiting sleeve 29 and the valve core seat 26 cooperates to form the mounting groove, the assembled position-limiting sleeve 29 and valve core seat 26 need to be relatively fixed, and may be fixed by welding or threaded connection. The position-limiting sleeve 29 and the valve core seat 26 of the electronic expansion valve in this embodiment may be fixed via the gear system 23.

Figure 13:
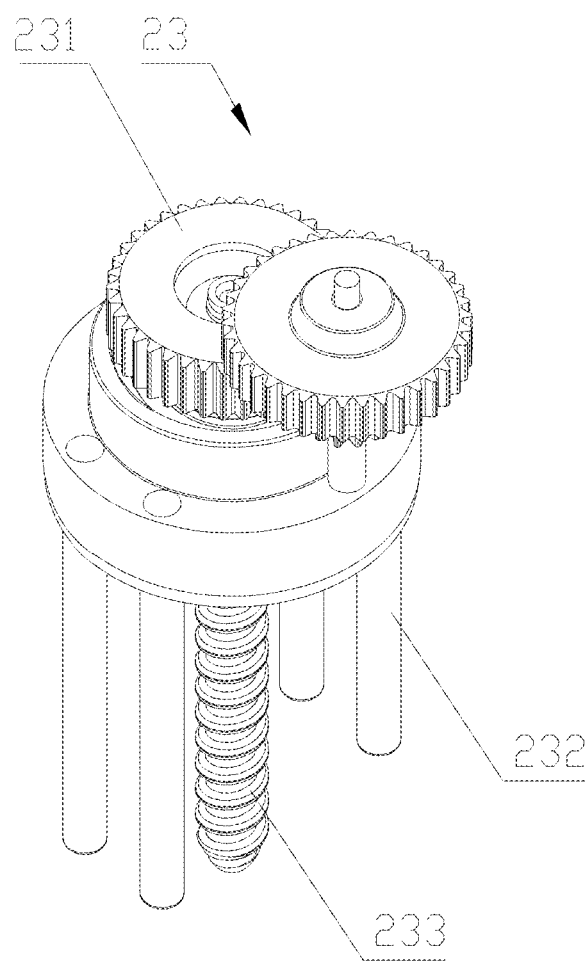
FIG. 13 is a schematic view showing the structure of a gear system in FIG. 3.
Figure 14:
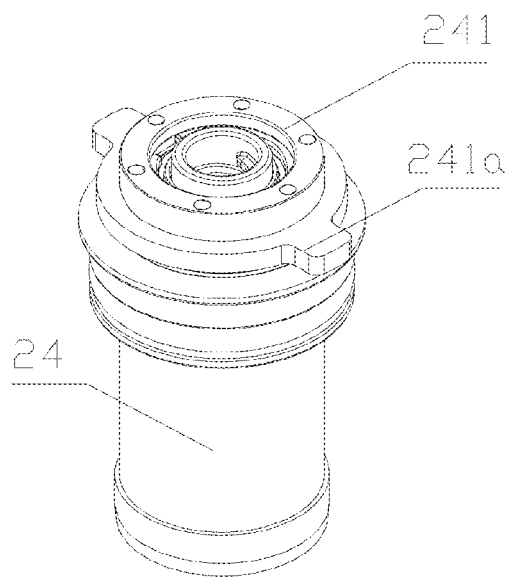
FIG. 14 is a schematic view showing the structure of the valve rod in FIG. 3.
Figure 15:
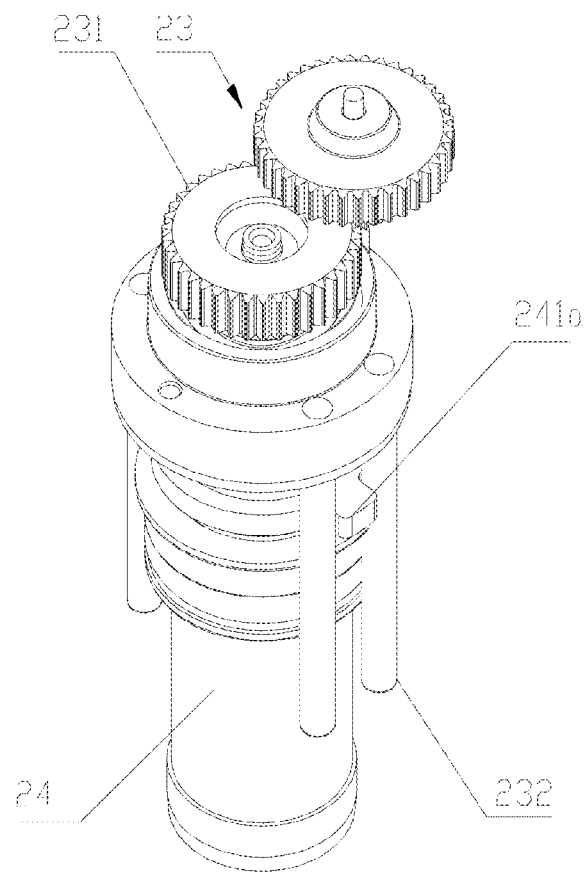
FIG. 15 is a schematic view showing the structure of cooperation between the gear system and the valve rod in FIG. 3.

As shown in FIGS. 13 to 15, FIG. 13 is a schematic view showing the structure of the gear system in FIG. 3, FIG. 14 is a schematic view showing the structure of the valve rod in FIG. 3, and FIG. 15 is a schematic view showing the structure when the gear system and the valve rod in FIG. 3 cooperate.

The electronic expansion valve may include the gear system 23 driving the valve rod 24 to move axially, the gear system 23 includes gears 231 and a screw rod 233, and the electric machine 22 of the electronic expansion valve drives the gears 231 of the gear system 23 to rotate. The screw rod 233 rotates with the gears 231 and cooperates with the valve rod 24 via screw threads, as shown in FIGS. 3 and 11, when the valve rod 24 is circumferentially positioned, the screw rod 233 may rotate to drive the valve rod 24 to move axially. For circumferentially positioning the valve rod 24, the gear system 23 may includes position-limiting rods 232 configured to limit the valve rod 24 to circumferentially rotate, as shown in FIG. 15, a buckle 241 is provided at an upper end of the valve rod 24, and a lug boss 241a of the buckle 241 is inserted between two position-limiting rods 232. Since positions of the position-limiting rods 232 are fixed, the buckle 241 can't rotate, thereby limiting the circumferential rotation of the valve rod 24, therefore the valve rod 24 can only move axially.

The position-limiting rods 232 of the gear system 23 herein may press the position-limiting sleeve 29 tightly on the upper end surface of the valve core seat 26, as shown in FIG. 3. Therefore, position-limiting rods 232 of the gear system 23 are used to tightly press the position-limiting sleeve 29 in this structure to fix the position-limiting sleeve 29 and the valve core seat 26, thereby having a simple structure, and facilitating assembly and disassembly, thus it is simple and convenient to change components such as the position-limiting sleeve 29 and the sealing ring 271.

Preferably, the electronic expansion valve further includes a ring-shaped slide-assisting sheet 272 arranged inside the mounting groove, continuing to refer to FIGS. 10 and 12, the slide-assisting sheet 272 is in contact with the outer lateral wall of the valve rod 24, and the sealing ring 271 is arranged between the slide-assisting sheet 272 and the inner lateral wall of the valve core seat 26. In a case that a pressure difference exists between the first connecting port and the second connecting port, the pressure extrudes the sealing ring 271 and causes deformation to the sealing ring 271, the slide-assisting sheet 272 may response to the extruding force of the sealing ring 271 and accordingly fits closely a smooth outer wall of the valve rod 24, therefore, no matter high pressure refrigerant is at the first connecting port or at the second connecting port, the refrigerant leakage may be avoided. And compared with a case that the sealing ring 271 is in a direct contact with the valve rod 24, the slide-assisting sheet 272 greatly reduces a frictional resistance to the axial movement of the valve rod 24. Thus the slide-assisting sheet 272 has both a sealing performance and a sliding performance.

A cross section of the slide-assisting sheet 272 may be C shaped, and the C-shaped opening of the cross section faces to the sealing ring 271, a camber of the C-shaped slide-assisting sheet 272 facilitates assembling and guiding the valve rod 24, since the C-shaped slide-assisting sheet 272 cooperates with a surface of the sealing ring 271, the slide-assisting sheet 272 sliding with respect to the sealing ring 271 during assembly can be avoided. And with such a design, the slide-assisting sheet 272 is apt to sense a deformation degree of the sealing ring 271, besides, a contact area between the slide-assisting sheet 272 and the valve rod 24 is small, thereby further decreasing the frictional resistance to the axial movements of the valve rod 24.

A thickness of the slide-assisting sheet 272 may range from 0.2 mm to 0.6 mm, the slide-assisting sheet 272 with such thickness can sensitively sense the deformation degree of the sealing ring 271 to fit closely the valve rod 24 and ensure the sealing performance. For further decreasing the frictional coefficient, a polytetrafluoroethylene (PTFE) is adopted in materials of the slide-assisting sheet 272, and of course, the slide-assisting sheet 272 may also be made of common plastic materials.

An electronic expansion valve according to the present application is described in detail hereinbefore. The principle and the embodiments of the present application are illustrated herein by specific examples. The above description of examples is only intended to help the understanding of the method and idea of the present application. It should be noted that, for the person skilled in the art, a few of improvements and modifications may be made to the present application without departing from the principle of the present application, and these improvements and modifications are also deemed to fall into the scope of the present application defined by the claims.

The invention claimed is:

1. An electronic expansion valve, wherein a valve rod is provided inside a valve cavity of the electronic expansion valve, the valve rod is axially movable along an axial through-hole of a valve seat of the electronic expansion valve, to open or close a valve port arranged in the valve seat in order to allow or prevent the communication between two connecting ports of the electronic expansion valve, wherein the valve rod is provided with an axial through-hole in communication with the valve port, a lateral wall of the axial through-hole of the valve seat is sealed with respect to the valve rod, an end surface of the valve rod comprises a sealing surface able to be in contact seal with an end surface at the valve port, the sealing surface comprises a first sealing surface configured to bear an acting force of a refrigerant at one connecting port, and a second sealing surface configured to bear an acting force of a refrigerant at another connecting port; and the first sealing surface has an effective pressure-bearing area equal to an effective pressure-bearing area of the second sealing surface;

wherein one of an inner lateral wall of the axial through-hole of the valve seat and an outer lateral wall of the valve rod is provided with a mounting groove, and a sealing ring is provided inside the mounting groove;

wherein the valve seat comprises a valve core seat and a valve seat base, the valve core seat is inserted into the valve seat base, the axial through-hole is provided in the valve core seat, the axial through-hole of the valve core seat is a stepped hole, and the stepped hole forms a ring-shaped step surface facing a valve house (21) of the electronic expansion valve; and the valve seat further comprises a position-limiting sleeve, the position-limiting sleeve is inserted into the stepped hole, an end portion of the position-limiting sleeve has a ring-shaped radial lug boss, the radial lug boss overlaps an end surface, facing the valve house, of the valve core seat, and the mounting groove is formed by an inner lateral wall of the valve core seat, an end surface facing the valve port of the position-limiting sleeve, and the ring-shaped step surface; and wherein the electronic expansion valve further comprises a gear system to drive the valve rod to move axially, the gear system comprises position-limiting rods to limit the circumferential rotation of the valve rod, and the position-limiting rods tightly press the position-limiting sleeve onto the valve core seat.

2. The electronic expansion valve according to claim 1, wherein the valve rod is a cylinder, which comprises a small-diameter section cylinder and a large-diameter section cylinder close to the valve port and an end surface of the large-diameter section cylinder comprises the first sealing surface and the second sealing surface.

3. The electronic expansion valve according to claim 2, wherein an outer ring diameter of the end surface of the large-diameter section cylinder is greater than or equal to an outer ring diameter of the sealing surface at the valve port, an inner ring diameter of the end surface of the large-diameter section cylinder is less than an inner ring diameter of the sealing surface at the valve port; and the outer ring diameter of the end surface of the large-diameter section cylinder, the inner ring diameter of the sealing surface at the valve port, and an outer ring diameter of the sealing surface at the valve port meet the following relationship:

$$D_1 \approx \frac{\sqrt{2}}{2}\sqrt{D_3^2 + D_4^2};$$

where D1 is the outer diameter of the small-diameter section cylinder, D3 is the outer ring diameter of the sealing surface at the valve port, and D4 is the inner ring diameter of the sealing surface at the valve port.

4. The electronic expansion valve according to claim 3, wherein the inner ring diameter and the outer ring diameter of the sealing surface at the valve port meet the following relationship:

0.4 mm≤D3−D4≤4 mm.

5. The electronic expansion valve according to the claim 3, wherein an end portion of the large-diameter section cylinder and/or, one end, where the valve port (251) is arranged, of the valve seat, are provided with a chamfering.

6. The electronic expansion valve according to claim 1, wherein the valve seat comprises a valve core seat and a valve seat base, the two connecting ports and the valve port are opened in the valve seat base, the valve core seat is inserted into the valve seat base, and the axial through-hole is provided in the valve core seat.

7. The electronic expansion valve according to the claim 6, wherein the valve core seat is opened with a lateral hole in communication with one of the two connecting ports, a width of the lateral hole is increased in a direction away from the valve port, the one of the two connecting ports in communication with the lateral hole may communicate with the valve port via the lateral hole in a case that the valve rod moves axially to disengage from the valve port; the another connecting port is in communication with the valve port.

8. The electronic expansion valve according to the claim 1, wherein a check ring is provided between the sealing ring and the ring-shaped step surface, an assembling clearance exists between a lateral wall of a small-diameter section of the stepped hole of the valve core seat and the valve rod, and the check ring is in a clearance fit with the valve rod.

9. The electronic expansion valve according to the claim 1, wherein electronic expansion valve further comprises a ring-shaped slide-assisting sheet arranged inside the mounting groove, the slide-assisting sheet is in contact with the outer lateral wall of the valve rod, and the sealing ring is arranged between the slide-assisting sheet and the inner lateral wall of the valve core seat.

10. The electronic expansion valve according to the claim 9, wherein a cross section of the slide-assisting sheet is C-shaped, and a C-shaped opening of the cross section faces the sealing ring.

11. The electronic expansion valve according to the claim 9, wherein a thickness of the slide-assisting sheet ranges from 0.2 mm to 0.6 mm.

12. The electronic expansion valve according to the claim 9, wherein polytetrafluoroethylene is one of materials of the slide-assisting sheet.

13. The electronic expansion valve according to claim 2, wherein the valve seat comprises a valve core seat and a valve seat base, the two connecting ports and the valve port are opened in the valve seat base, the valve core seat is inserted into the valve seat base, and the axial through-hole is provided in the valve core seat.

14. The electronic expansion valve according to claim 3, wherein the valve seat comprises a valve core seat and a valve seat base, the two connecting ports and the valve port are opened in the valve seat base, the valve core seat is inserted into the valve seat base, and the axial through-hole is provided in the valve core seat.

15. The electronic expansion valve according to claim 4, wherein the valve seat comprises a valve core seat and a valve seat base the two connecting ports and the valve port are opened in the valve seat base, the valve core seat is inserted into the valve seat base, and the axial through-hole is provided in the valve core seat.

* * * * *